Patented Oct. 24, 1922.

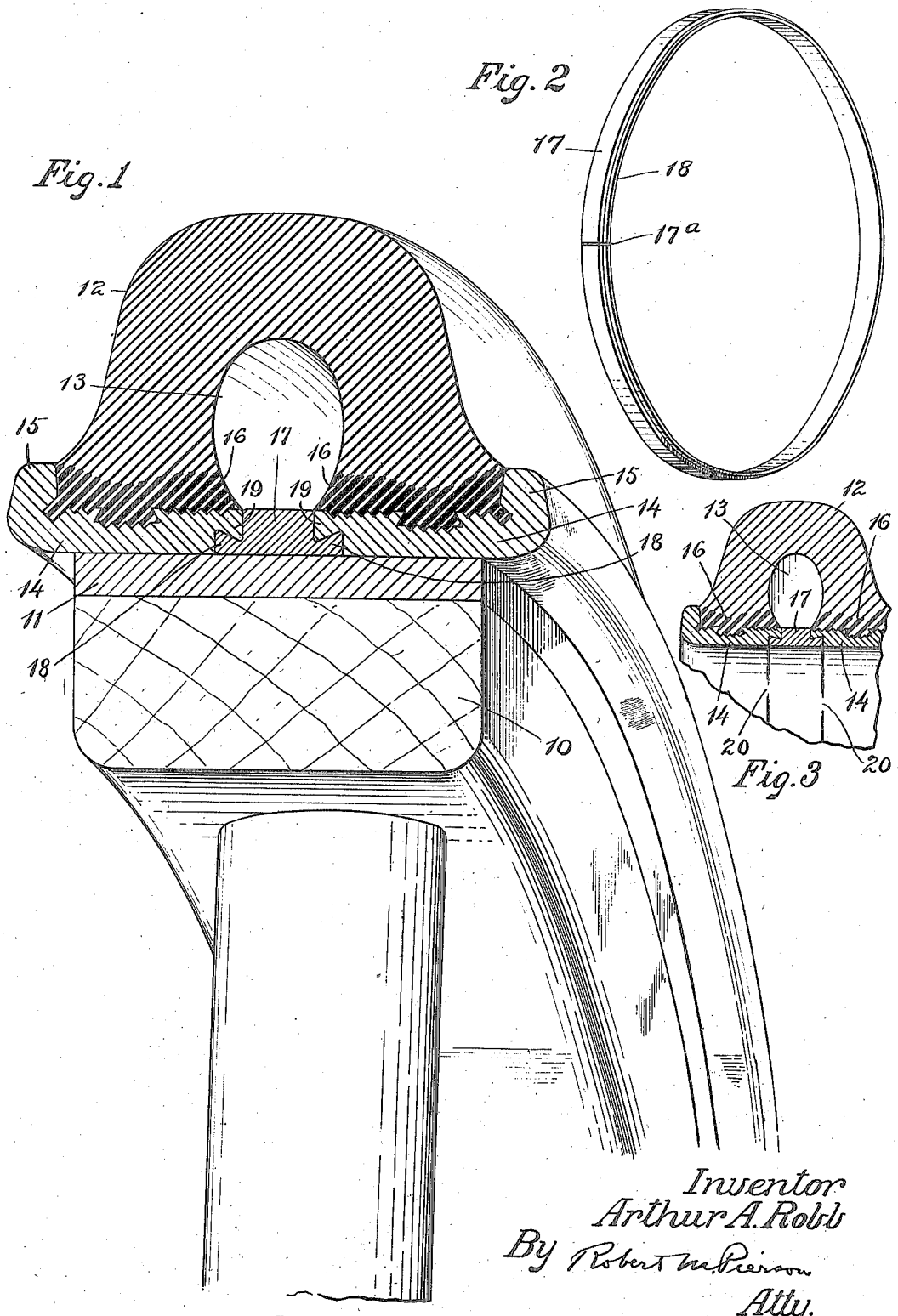

1,433,301

UNITED STATES PATENT OFFICE.

ARTHUR A. ROBB, OF AKRON, OHIO, ASSIGNOR TO THE B. F. GOODRICH COMPANY, OF NEW YORK, N. Y., A CORPORATION OF NEW YORK.

CUSHION TIRE.

Application filed June 10, 1920. Serial No. 387,819.

*To all whom it may concern:*

Be it known that I, ARTHUR A. ROBB, a citizen of the United States, residing at Akron, in the county of Summit and State of Ohio, have invented a certain new and useful Cushion Tire, of which the following is a specification.

This invention relates to vehicle tires having a rubber cushion body of arched or internally recessed form vulcanized on a metal base or rim, and my principal object is to admit of the withdrawal of the core sections used to impart the recessed or channeled form to the rubber body, and leave or provide, after such withdrawal, a self-contained or unitary tire base adapted to be securely mounted on a fixed rim or wheel felly of any one of the orinary types, complementally formed to receive said tire base, the invention being especially effective in connection with tires of the pressed-on variety.

Of the accompanying drawings,

Fig. 1 is a perspective view, partly in section, of a portion of a tire embodying my invention, mounted on a wheel.

Fig. 2 is a perspective view of the split, middle interlocking ring.

Fig. 3 is a sectional view of a portion of my improved tire demounted to show the integral connection of the spacing means with the main rim members.

Referring to the drawings, 10 is the felly of an ordinary spoked wheel having a metal felly band or fixed rim 11 shrunk thereon. 12 is the arched tire body of soft vulcanized rubber, whose side and base portions are divided by a recess or channel 13, in this case continuous, of ovoid form in section, which imparts a high degree of compressibility to the tire in a radial direction. In order to remove the core which is used for molding the channel 13, it is necessary at least partially to separate the base portions of both the rubber and the metal parts of the tire, the separation shown in this case being complete. Tires of this general type have been variously made U-shaped, truncated V-shaped, ellipsoidal, etc., in sectional form and often provided with non-skid projections on the tread. I do not restrict myself in these particulars, although it is highly desirable so to proportion and shape the tire body as to avoid breaking down under continued use, and considerable skill may be exercised in these particulars. The shape and proportions shown in the drawings have been found to give good results after considerable experiment.

14, 14 are two annular metal rim members, each provided with half of a tire channel having an outer flange 15, and grooved or dove-tailed to interlock with the layer of vulcanized hard rubber 16 by which each rim member is united with the soft rubber tire body.

17 is a ring, transversely split at 17$^a$ and substantially T-shaped in section, with the cross-bar of the T at the inner periphery of the metal rim structure, the side projecting portions 18 of this ring being dove-tailed or undercut and interfitting with complemental overhanging portions 19 formed on the inner edges of the rim members 14, so that when the ring 17 is sprung outwardly from the inner periphery of the tire rim into the seat provided for it on and between the rim members, the latter will be accurately spaced from each other by the locking ring and also interlocked with said ring against transverse separation.

The inner peripheries of the rim members 14 and the ring 17 are formed cylindrically of the same diameter, which is very slightly less than the diameter of the cylindrical outer surface of the felly band 11, so that a heavy pressure is required to force the tire onto the wheel and when so located thereon it is securely held by friction in the manner of an ordinary pressed-on tire. The ring 17 is then effectively held against radial collapse by the felly band and its interlocking engagement with the metal base or rim members on the tire is securely maintained.

The ring 17 is united with both of the rim members 14 by spot-welding it thereto as indicated at 20, 20 in Fig. 3, thereby supplementing the dove-tail interlocking of the parts to form a permanent connection between them. This connection prevents the lateral spreading of the rim members, as well as their relative circumferential movement when the tire is used on a driving wheel, which movement would be detrimental to the life of the tire; and the spot-welding holds the ring in place during handling and application of the tire and insures a smooth inner periphery without possibility of catching of the ring on the fixed rim during such application.

I do not claim broadly the use of a ring or other spacer between the base members of an arched, vulcanized-on cushion tire of this general type and my invention is not wholly limited to the use of this kind of a spacer nor to a particular degree of spacing nor to the particular means of forming a permanent union of the spacing means with the base members.

I claim:

1. A vehicle tire comprising a pair of endless metal base members, spacing means interposed between and permanently united with both of said members, and a rubber cushion tire body of arched cross sectional form having its legs respectively vulcanized upon said base members.

2. A vehicle tire comprising a pair of endless metal base members, a cushion member of arched, cross-sectional form having its legs respectively vulcanized to said base members, and a transversely divided, metal ring interposed between said base members and so united with both of the latter as to make substantially a unitary structure of said base members and said ring.

3. The method of making a cushion tire for vehicles which comprises molding and vulcanizing a rubber cushion member upon a pair of endless metal base members, around a core, removing the core, interposing a spacing structure between said base members, and permanently securing it to the latter.

In testimony whereof I have hereunto set my hand this 2nd day of June, 1920.

ARTHUR A. ROBB.